United States Patent
Floreano et al.

(10) Patent No.: US 10,860,014 B2
(45) Date of Patent: Dec. 8, 2020

(54) JACKET FOR EMBODIED INTERACTION WITH VIRTUAL OR DISTAL ROBOTIC DEVICE

(71) Applicant: ECOLE POLYTECHNIQUE FEDERALE DE LAUSANNE (EPFL), Lausanne (CH)

(72) Inventors: Dario Floreano, St-Prex (CH); Carine Rognon, Ecublens (CH); Stefano Mintchev, Lausanne (CH); Alice Concordel, Nyon (CH); David Atienza Alonso, Echandens (CH); Fabio Isidoro Tiberio Dell'Agnola, Faido (CH)

(73) Assignee: ECOLE POLYTECHNIQUE FÉDÉRALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 16/330,993

(22) PCT Filed: Sep. 8, 2017

(86) PCT No.: PCT/IB2017/055410
§ 371 (c)(1),
(2) Date: Mar. 6, 2019

(87) PCT Pub. No.: WO2018/047102
PCT Pub. Date: Mar. 15, 2018

(65) Prior Publication Data
US 2019/0258239 A1    Aug. 22, 2019

Related U.S. Application Data

(60) Provisional application No. 62/385,283, filed on Sep. 9, 2016.

(51) Int. Cl.
*G08B 6/00* (2006.01)
*G09B 21/00* (2006.01)
(Continued)

(52) U.S. Cl.
CPC ......... *G05D 1/0016* (2013.01); *A61H 1/0229* (2013.01); *A61H 1/0274* (2013.01);
(Continued)

(58) Field of Classification Search
CPC ...... G05D 1/0016; G05D 1/101; G06F 3/016; B64C 39/024; B64C 2201/146;
(Continued)

(56) References Cited

U.S. PATENT DOCUMENTS

| 5,833,656 A | 11/1998 | Smith et al. |
| 7,410,338 B2 | 8/2008 | Schiele et al. |

(Continued)

FOREIGN PATENT DOCUMENTS

| CN | 205459699 | 8/2016 |
| WO | 2011/127410 | 10/2011 |

OTHER PUBLICATIONS

International Search Report for PCT/IB2017/055410, dated Dec. 14, 2017, 4 pages.
(Continued)

*Primary Examiner* — Tanmay K Shah
(74) *Attorney, Agent, or Firm* — Nixon & Vanderhye P.C.

(57) ABSTRACT

A system for interacting with a remote object comprising a wearable jacket for a user, two actuators for supporting arms of the user, motors for causing movements to at least one of a torso and the arms of the user, and sensors for measuring at least one of a force applied to the user and a position of the user, and a controller and data transmission device for communicating with the remote object.

12 Claims, 15 Drawing Sheets

(51) Int. Cl.
| | |
|---|---|
| H04B 3/36 | (2006.01) |
| G05D 1/00 | (2006.01) |
| A61H 1/02 | (2006.01) |
| B25J 9/00 | (2006.01) |
| B64C 39/02 | (2006.01) |
| G05D 1/10 | (2006.01) |
| G06F 3/01 | (2006.01) |
| A63H 30/04 | (2006.01) |
| A63H 27/00 | (2006.01) |
| A63G 31/16 | (2006.01) |

(52) U.S. Cl.
CPC ......... *A61H 1/0277* (2013.01); *A61H 1/0281* (2013.01); *A61H 1/0285* (2013.01); *A63G 31/16* (2013.01); *A63H 27/02* (2013.01); *A63H 30/04* (2013.01); *B25J 9/0006* (2013.01); *B64C 39/024* (2013.01); *G05D 1/101* (2013.01); *G06F 3/016* (2013.01); *A61H 2201/123* (2013.01); *A61H 2201/165* (2013.01); *A61H 2201/1638* (2013.01); *A61H 2201/5061* (2013.01); *A61H 2201/5064* (2013.01); *A61H 2203/0406* (2013.01); *A61H 2205/06* (2013.01); *A61H 2230/625* (2013.01); *B64C 2201/146* (2013.01)

(58) Field of Classification Search
CPC ........ B25J 9/0006; A63H 30/04; A63H 27/02; A63G 31/16; A61H 1/0274; A61H 1/0229; A61H 2201/5064; A61H 2201/5061; A61H 2201/165; A61H 2201/1638; A61H 2201/123; A61H 1/0285; A61H 1/0281; A61H 1/0277; A61H 2230/625; A61H 2205/06; A61H 2203/0406
USPC ...................................... 340/407.2
See application file for complete search history.

(56) References Cited

U.S. PATENT DOCUMENTS

| | | | | |
|---|---|---|---|---|
| 2003/0223844 | A1* | 12/2003 | Schiele | A61H 1/0274 414/5 |
| 2005/0113167 | A1* | 5/2005 | Buchner | A63F 13/02 463/30 |
| 2014/0277739 | A1* | 9/2014 | Kornbluh | B25J 9/0006 700/260 |

OTHER PUBLICATIONS

Written Opinion of the ISA for PCT/IB2017/055410, dated Dec. 14, 2017, 6 pages.
Ando, Hideyuki, et al., "A wearable force display based on brake change in angular momentum," Proceedings of the International Conference on Artificial Reality and Telexistence (ICAT 2002), Dec. 2002, pp. 16-21.
Bülthoff, H., Cablerobot-simulator, Max-Planck-Gesellschaft, May 24, 2016, https://www.mpg.de/9395107/seilroboter.
Burdet, Etienne, et al., "Human Robotics: Neuromechanics and Motor Control," The MIT Press, Sep. 13, 2013.
Carpenter, Michele, et al., "A New Spin on Space Suites: Personal "Gravity Packs" Could Help Astronauts Live and Work in Space," IEEE Spectrum, vol. 52, No. 10, Oct. 2015, pp. 30-35.
Cipriani, Christian, et al., "A Miniature Vibrotactile Sensory Substitution Device for Multi-fingered Hand Prosthetics," IEEE Transactions on Biomedical Engineering, vol. 59, No. 2, 2011, pp. 400-408.
Conor, W, "Soft Exosuits," Harvard Biodesign Lab, Jun. 7, 2016, http://people.seas.harvard.edu/_assbeck/research exosuits.html.
Dalecki, Diane, et al., "Tactile perception of ultrasound," Journal of Acoustical Society of America, vol. 97, No. 5, Pt. 1, May 1995, pp. 3165-3170.
De Rossi, Danilo, et al., "Electroactive polymer patches for wearable haptic interfaces," 33rd Annual International Conference of the IEEE Engineering in Medicine and Biology Society, 2011, pp. 8369-8372.
Ding, Ye, et al., "Multi-joint Actuation Platform for Lower Extremity Soft Exosuits," 2014 IEEE International Conference on Robotics and Automation (ICRA), May 2014, pp. 1327-1334.
Ding, Ye, et al., "Biomechanical and Physiological Evaluation of Multi-Joint Assistance With Soft Exosuits," IEEE Transactions on Neural Systems and Rehabilitation Engineering, vol. 25, No. 2, 2016, pp. 119-130.
Dobrzynski, Michal Karol, et al., "Quantifying Information Transfer Through a Head-Attached Vibrotactile Display: Principles for Design and Control," IEEE Transactions on Biomedical Engineering, vol. 59, No. 7, Jul. 2012, pp. 2011-2018.
Gavrilov, L. R., et al., "Application of Focused Ultrasound for the Stimulation of Neural Structures," Ultrasound in Medicine & Biology, vol. 22, No. 2, 1996, pp. 179-192.
Iberall, Arthur S., "The Use of Lines of Nonextension to Improve Mobility in Full-Pressure Suits," Rand Development Corporation, 1964, 44 pages.
In, Hyunki, et al., "Exo-Glove: A Soft Wearable Robot for the Hand with a Soft Tendon Routing System," IEEE Robotics & Automation Magazine, vol. 22, No. 1, 2015, pp. 97-105.
Kaczmarek, Kurt A., et al., "Electrotactile and Vibrotactile Displays for Sensory Substitution Systems," IEEE Transactions on Biomedical Engineering, vol. 38, No. 1, Jan. 1991, pp. 1-16.
Karlen, Walter, et al., "Enhancing Pilot Performance with a SymBodic System," 2010 Annual International Conference of the IEEE Engineering in Medicine and Biology, 2010, pp. 6599-6602.
Kim, Munsang, et al., "Development of a Humanoid Robot CENTAUR—Design, Human Interface, Planning and Control of its upper-body," IEEE SMC'99 Conference Proceedings, 1999 IEEE International Conference on Systems, Man, and Cybernetics, Cat. No. 99CH37028, vol. 4, Oct. 1999, pp. 948-953.
Kim, Yoon Sang, et al., "A Force Reflected Exoskeleton-Type Masterarm for Human-Robot Interaction," IEEE Transactions on Systems, Man, and Cybernetics—Part A: Systems and Humans, vol. 35, No. 2, Mar. 2005, pp. 198-212.
Kölsch, Mathias, et al., "The Postural Comfort Zone for Reaching Gestures," Proceedings of the Human Factors and Ergonomics Society Annual Meeting, vol. 47, No. 4, Oct. 2003, pp. 787-791.
Koo, Inwook, et al., "Development of a Meal Assistive Exoskeleton made of Soft Material for polymyositis patients," 2014 IEEE/RSJ International Conference on Intelligent Robots and Systems (IROS 2014), Sep. 2014, pp. 542-547.
Lee, Hyung Seok, et al., "Design analysis and fabrication of arrayed tactile display based on dielectric elastomer actuator," Sensors and Actuators A: Physical, vol. 205, 2014, pp. 191-198.
Lemus, D., et al., "Towards Gyroscopic Balance Assistance: Proof of Concept," Proceedings of the 36th Annual International Conference of the IEEE Engineering in Medicine and Biology Society (EMBC14), Aug. 2014, pp. 26-30.
Li, Dustin, et al., "Gyroscopic Assistance for Human Balance," The 12th IEEE International Workshop on Advanced Motion Control, Mar. 2012, 6 pages.
Lindeman, Robert W., et al., "Towards Full-Body Haptic Feedback: The Design and Deployment of a Spatialized Vibrotactile Feedback System," Proceedings of the ACM Symposium on Virtual Reality Software and Technology, Nov. 2004, pp. 146-149.
Murer, Martin, et al., "TorqueScreen: Actuated Flywheels for Ungrounded Kinesthetic Feedback in Handheld Devices," Proceedings of the Ninth International Conference on Tangible, Embedded, and Embodied Interaction, Jan. 2015, pp. 161-164.
Pons, Jóse L., "Wearable Robots: Biomechatronic Exoskeletons," John Wiley & Sons Ltd, 2008, 360 pages.
Ramos, Joao, et al., "A Balance Feedback Human Machine Interface for Humanoid Teleoperation in Dynamic Tasks," 2015 IEEE/RSJ International Conference on Intelligent Robots and Systems (IROS), Sep. 2015, pp. 4229-4235.

(56) References Cited

OTHER PUBLICATIONS

Rebelo, João, et al., "Bilateral Robot Teleoperation—A Wearable Arm Exoskeleton Featuring an Intuitive User Interface," IEEE Robotics & Automation Magazine, vol. 21, No. 4, Dec. 2014, pp. 62-69.

Rheiner, M., Birdly Product Sheet, May 24, 2016, http://somniacs.co/birdly/.

Robuffo Giordano, P., et al., "Visual-Vestibular Feedback for Enhanced Situational Awareness in Teleoperation of UAVs," 66th American Helicopter Society International Annual Forum 2010, May 2010, pp. 2809-2818.

Schiele, André, et al., "A New Generation of Ergonomic Exoskeletons—The High-Performance X-Arm-2 for Space Robotics Telepresence," 2011 IEEE/RSF International Conference on Intelligent Robots and Systems, Sep. 2011, pp. 2158-2165.

Scribano, F., et al., "Design, Development and Fabrication of a Personnel Armor Load Profile Analyzer," IIT Research Institute, Technical Report 70-65-CE, Clothing and Personal Life Support Equipment Laboratory C&PLSEL-75, Apr. 1970, 146 pages.

Suh, Chansu, et al., "Soft Pneumatic Actuator Skin with Embedded Sensors," 2014 IEEE/RSF International Conference on Intelligent Robots and Systems (IROS 2014), Sep. 2014, pp. 2783-2788.

Tachi, Susumu, "Telexistence—Past, Present, and Future," Virtual Realities, 2015, pp. 229-259.

Wang, Albert, et al., "The Hermes Humanoid System: A Platform for Full-body Teleoperation with Balance Feedback," 2015 IEEE-RAS 15th International Conference on Humanoid Robots (Humanoids), Nov. 2015, pp. 790-737.

Yang, Ungyeon, et al., "Designing a Vibro-Tactile Wear for "Close Range" Interaction for VR-based Motion Training," International Conference on Artificial Reality and Telexistence (ICAT 2002), Dec. 2002, pp. 4-9.

Yeoh, O. H., "Some Forms of the Strain Energy Function for Rubber," Rubber Chemistry and Technology, vol. 66, No. 5, 1993, pp. 754-771.

Humphrey II Interactive Flight Simulator Project, ARS Electronica Futurelab, May 24, 2016, http://www.formquadrat.com/en/concept-design/aec-humphreyii.html.

SuperFlex Brochure, SRI International, May 24, 2016, https://www.sri.com/sites/default/files/brochures/superflex.pdf.

Teslasuit Brochure, Tesla Studios, Jun. 1, 2016, http://www.teslastudios.co.uk/.

International Federation of Robotics. (May 31, 2016). Services robots statistics, [Online]. Available: http://www.ifr.org/service-robots/statistics/.

\* cited by examiner

JACKET FOR EMBODIED INTERACTION WITH VIRTUAL OR DISTAL ROBOTIC DEVICE

CROSS-REFERENCE TO RELATED APPLICATIONS

This application is the U.S. national phase of International Application No. PCT/IB2017/055410 filed 8 Sep. 2017, which designated the U.S. and claims the benefit of US Application No. 62/385,283 that was filed on Sep. 9, 2016, the entire contents thereof herewithof each of which are incorporated by reference.

FIELD OF THE INVENTION

The present invention related to the field of haptic feedback and control devices, for example remote control devices, for controlling actuator systems including robots, drones, and other mechanically actuated devices that can be controlled by an operator.

DISCUSSION OF THE BACKGROUND

Gesture-based flight simulators with proprioceptive feedback have been suggested, and one background art device in gesture-based flight simulators is currently the Birdly shown in FIG. 1A, see reference [8]. It is a platform firstly developed at the Zuerich University of the Arts ("ZHdK") and now commercialized by the spin-off Somniacs. On this platform, the user lies horizontally with his arms spread out on wing-like structures. He receives vestibular feedback as the platform moves according to the simulated bird, visual feedback through a virtual reality head mounted display and feels air thanks to a fan whose intensity is related to the flight speed. The media greeted this technology favorably and users said that they enjoyed the experience a lot. However, this platform is cumbersome, heavy and expensive, and therefore hard for private individuals to acquire.

Previously, other attempts of flight simulators with proprioceptive feedback were done. In 2003, Formquadrat developed a flying platform where the user was suspended in the air with ropes attached to his feet, arms and back, as shown in FIG. 1B, see also reference [9]. He was in a lying position, facing down with arms wide open, and wearing data glasses which displayed a 3D flight environment. This device was exposed at the ARS Electronica Center in Linz but is not in use anymore.

Another type of proprioceptive simulator is one where the user sits on a moving platform that can simulate plane dynamics. This is the case of the CableRobot developed by the Max-Planck-Institute for Biological Cybernetics for perception and cognition research in humans, see the representation of FIG. 1C, see reference [10]. It is constituted of a cabin that can contain one sitting person and is suspended on eight cables driven by motors. This robot can perform movements of large amplitude and has high dynamics. It can even simulate roller coaster sensations. The user is also wearing a head mounted display for visual feedback.

Moreover, exoskeletons with haptic feedback interacting with a distal robot have been proposed. All the previously mentioned devices need heavy machinery to be used and stored. Therefore, there was a need for developing a more practical, smaller and cheaper device such as a wearable exoskeleton. The development of exoskeletons with haptic feedback is a hot topic as they would have a great benefit in teleoperation. Indeed, knowing the force that a teleoperated robot applies during manipulation or disbalance detection is very useful information, as shown in reference [3]. ESA in collaboration with the NASA are working on the X-Arm-2 device shown in FIG. 2A, a wearable exoskeleton that can teleoperate a KUKA robotic arm which would perform extra-vehicular activity while the astronaut can remain safely inside. See references [11], [14]. Their exoskeleton is for a single arm. It is composed of seven (7) degrees of freedom (DOFs) including shoulder, elbow and wrist joints and can be adapted to different morphologies. It can give force feedback with motors that are mounted on joints which can reach $\frac{1}{20}$th of the maximum human force. This exoskeleton weights 6 kg which is mainly due to the actuators. However most of the mass is located near the shoulder which makes it easier to carry.

Likewise, the Korea Institute of Science and Technology has developed an exoskeleton for both arms that can teleoperate the humanoid robot CENTAUR, see reference [12] to perform pick and place operations, see FIG. 2B and reference [13]. It consists also of a seven (7) DOFs device including shoulder, elbow and wrist joints which weighs less than 3 kg per arm as most of the mass is located on the back. The feedback is given by braking electrical motors to indicate contact.

The Biomimetic Robotics Lab developed an exoskeleton that transmits balance feedback from a humanoid robot to the human, as shown in FIG. 2C, and shown in references [42], [43]. Three load cells are embedded into each robot's foot to calculate its center of mass. When the robot loses balance, the human feels a force applied on his waist by mean of a mechanical interface and can react quickly to stabilize the robot. As this haptic feedback takes advantage of the human reflex, the reaction time is up to three times faster than if the control was only based on vision. To control the robot, the human is wearing an upper body motion capture suit. Thanks to the fast balance stabilization, the robot can punch through drywall without falling.

In general, state of the art exoskeletons with haptic feedback are heavy, cumbersome and don't have a good user acceptance. People are afraid to be hurt while wearing rigid exoskeleton, in addition they are usually complicated to be set in place due to their complexity which makes them not user-friendly. To solve these issues, exoskeleton research is currently looking at devices which are made of soft materials as their intrinsic compliance allows to adapt their shape to the user's body, they are more lightweight than rigid exoskeleton, and they get closer to the appearance of everyday life clothes such as jackets of gloves. In the current state of the art, soft exoskeletons are actuated with cables as it has the advantage to put the actuators remotely on strong body parts such at the torso instead of directly on the joint. For example, cables to actuate an elbow joint can be routed until the torso where the motor would be placed instead of having it directly on the joint. This way, less weight is located on the arm and the limb inertia is reduced. In addition, thanks to the intrinsic compliance of cable, human robot interaction is safer.

For example, the "Exosuit" currently developed by the Harvard Biodesign Lab whose objective is to assist during walking, see references [15], [16]. This device looks like a full leg harness, see in FIG. 3A. Electrical motors are pulling on two antagonistic cables starting from the hip, one going by the front part of the leg to the ankle which enhances swing phase of walking when it is pulled, the other is attached at its extremity to the lower part of the thigh to enhance the stance phase. As a result, this device is lightweight, not cumbersome and can even be worn under trousers.

A textile based and cable driven assistive device for the upper limb was developed by the Biorobotics Laboratory of the Seoul National University, see reference [18]. Its objective is to assist polymytosis patients to eat. It is composed of two cables, one to flex and raise the elbow, the second to bring the arm closer to the chest as shown in FIG. 3B. Both cables are actuated simultaneously to help the patient to bring a spoon to his mouth. As the textile support is made of stretchable neoprene fabrics, the device can fit many morphologies and the wearable part weights less than 500 g as actuators and power supply are remotely placed next to the subject.

Previously, the same laboratory developed a fully portable Exo-Glove which can support disable people during daily life manipulation, see FIG. 3C and reference [19]. Again, this device is cable driven and the actuator is remotely placed at the shoulder level. This glove allows a wrap grasp force of 40 N with three actuated fingers, for example thumb, index and middle finger. The glove part weights less than 200 g and allows many kinds of manipulation such as grasping or pitching. In 2016, the research organization SRI International is spinning off part of its robotics division into a new company called Superflex, see reference [20]. This new company is seeking to develop a wearable "exosuit" that can augment performance and assist people to overcome or prevent injuries or diseases. They claim to use muscle-like actuators but no further details are provided and no explanation to solve the problem of powering is given.

Moreover, gyroscopic flywheel based kinetic feedback devices have been proposed. When torque feedback must be given without fixation points to the ground or links between two body parts, one solution to give kinetic feedback is to use the flywheel principle. It consists of a high-speed rotating wheel that thus stores energy. When the wheel is either suddenly decelerated by braking, see reference [21], or if the wheel is mounted on a gimbal structure which can change its orientation, see reference [22], torque can be provided. Produced torque is proportional to the spinning speed and mass of the wheel, and the device can be attached on a single body part such as the torso.

Currently, research on flywheels is conducted for various applications. The Delft Biorobotics Laboratory wants to use gyroscopic flywheels mounted in a backpack to assist elderly people in case of disbalance, see for example FIG. 4A, see references [22] and [23]. When the device detects a strong acceleration, which corresponds to a person falling, a torque in the opposite direction is provided to counterbalance the movement and stabilize the person. The flywheel principle is also used to give feedback at hand level. At the Christian Doppler Laboratory for Contextual Interfaces, they implemented this technique to provide kinetic feedback when playing games with a tablet as shown in FIG. 4B, see also reference [24]. The October 2015 edition of IEEE Spectrum even devotes an article to the possibility of using this technique in astronaut space suits to compensate the lack of gravity by offering some resistance to movements, see reference [25].

SUMMARY

According to one aspect of the present invention, a system is provided for interacting with a remote object. The system preferably includes a wearable jacket for a user, two actuators for supporting arms of the user, motors for causing movements to at least one of a torso and the arms of the user, sensors for measuring at least one of a force applied to the user and a position of the user, and a controller and data transmission device for communicating with the remote object.

The above and other objects, features and advantages of the present invention and the manner of realizing them will become more apparent, and the invention itself will best be understood from a study of the following description with reference to the attached drawings showing some preferred embodiments of the invention.

BRIEF DESCRIPTION OF THE SEVERAL VIEWS OF THE DRAWINGS

The accompanying drawings, which are incorporated herein and constitute part of this specification, illustrate the presently preferred embodiments of the invention, and together with the general description given above and the detailed description given below, serve to explain features of the invention.

Herein, identical reference numerals are used, where possible, to designate identical elements that are common to the figures. Also, the images are simplified for illustration purposes and may not be depicted to scale.

DETAILED DESCRIPTION OF THE SEVERAL EMBODIMENTS

Figure 1A:
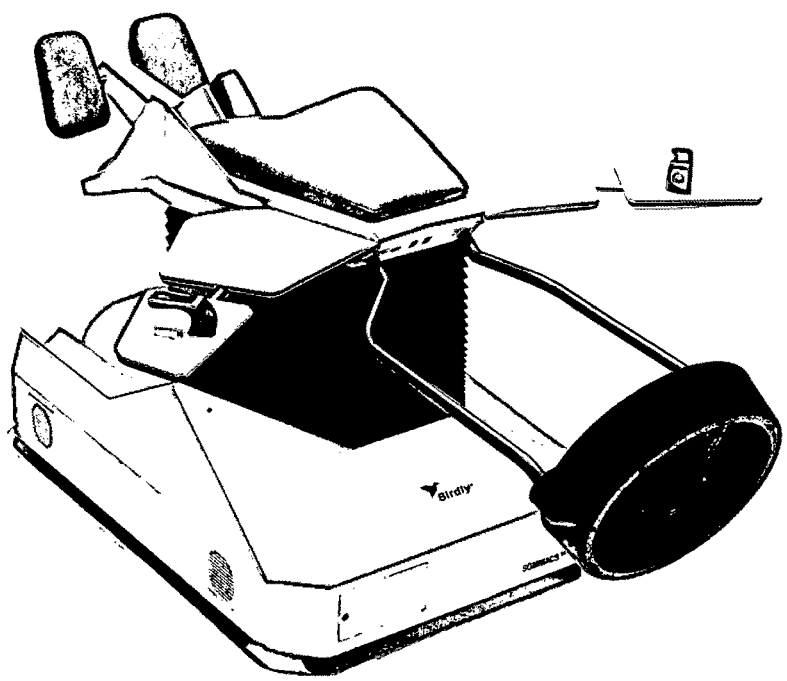
FIGS. 1A to 1C show examples of flight simulators having proprioceptive feedback capabilities including the designs Birdly (FIG. 1A), Humphrey (FIG. 1B), and Cable-Robot (FIG. 1C), according to the background art.
Figure 1B:
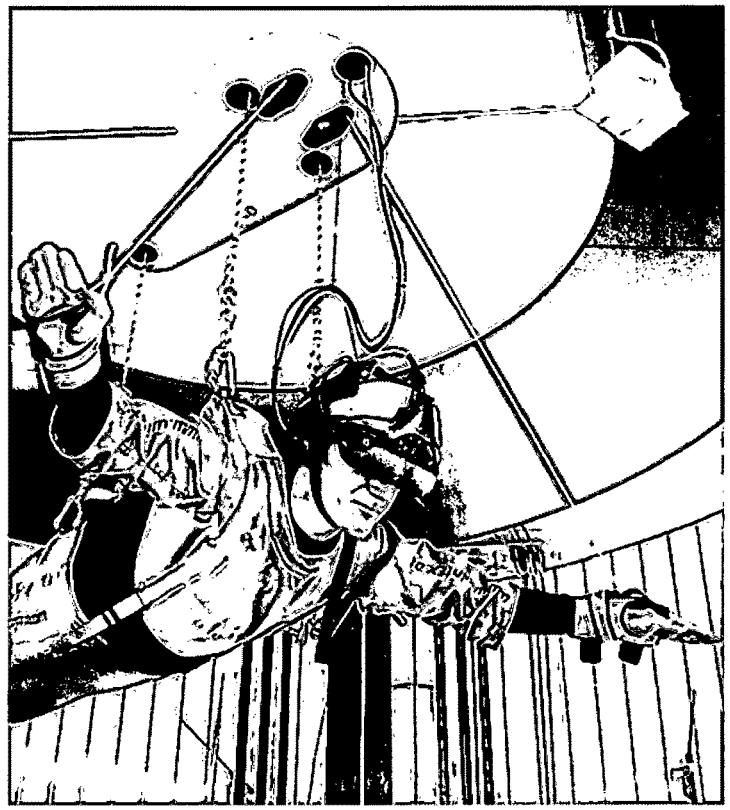
Figure 1C:
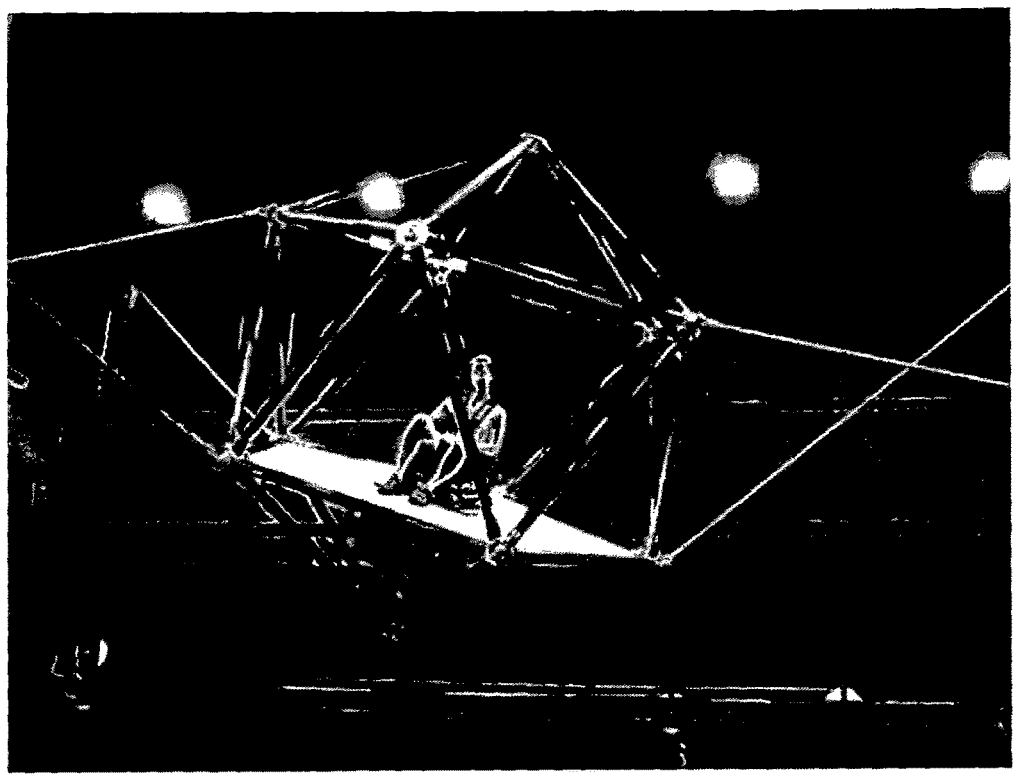
Figure 2A:
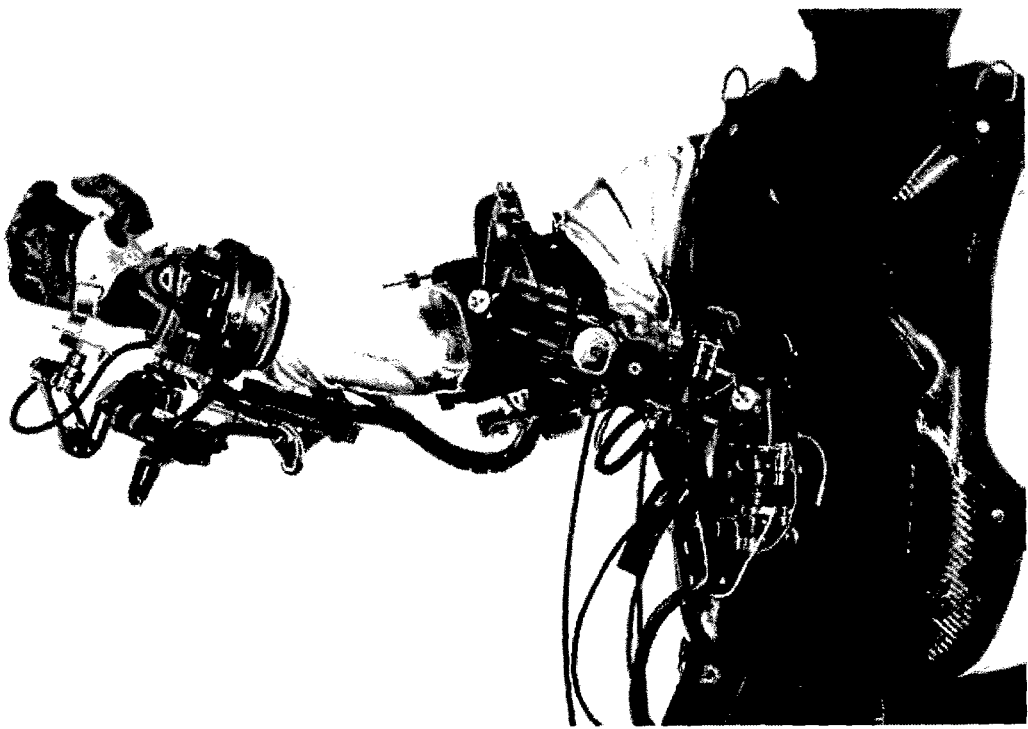
FIGS. 2A to 2C show examples of exoskeletons with haptic feedback interacting with a distal robot, including an X-Arm-2 for space robotics telepresence (FIG. 2A), a wearable exoskeleton to teleoperate humanoid robots (FIG. 2B), and the Hermes humanoid system (FIG. 2C), according to the background art.
Figure 2B:
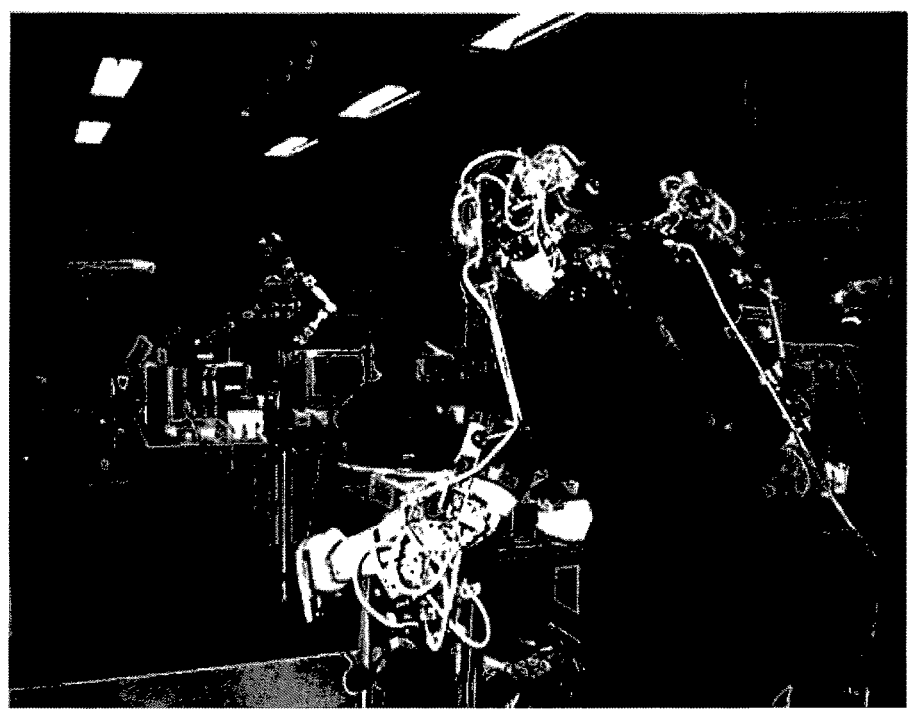
Figure 2C:
Figure 3A:
FIGS. 3A to 3C show examples of soft assistive devices including the designs Exosuit (FIG. 3A), textile-based upper limb assistive device (FIG. 3B), Exo-Glove (FIG. 3C), according to the background art.
Figure 3B:
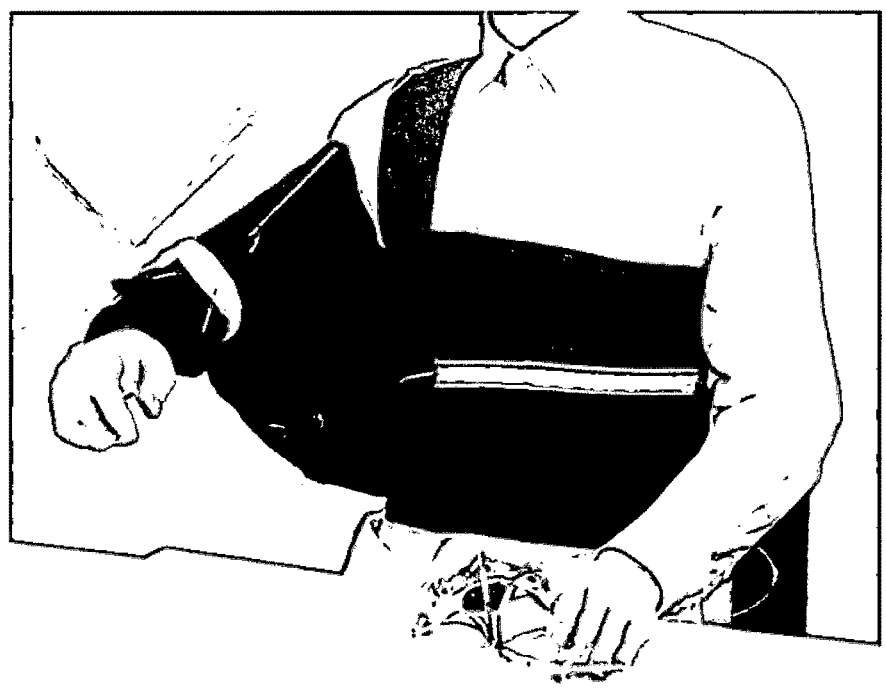
Figure 3C:
Figure 4A:
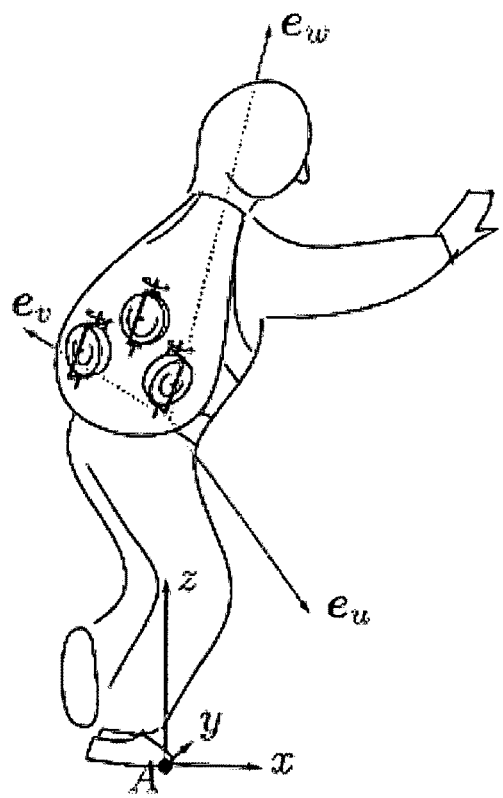
FIG. 4A and 4B show examples of devices that use gyroscopic flywheel based kinetic feedback, for example a backpack to assist elderly people in case of disbalance (FIG. 4A), and a haptic handheld feedback device TorqueScreen (FIG. 4B)
Figure 4B:
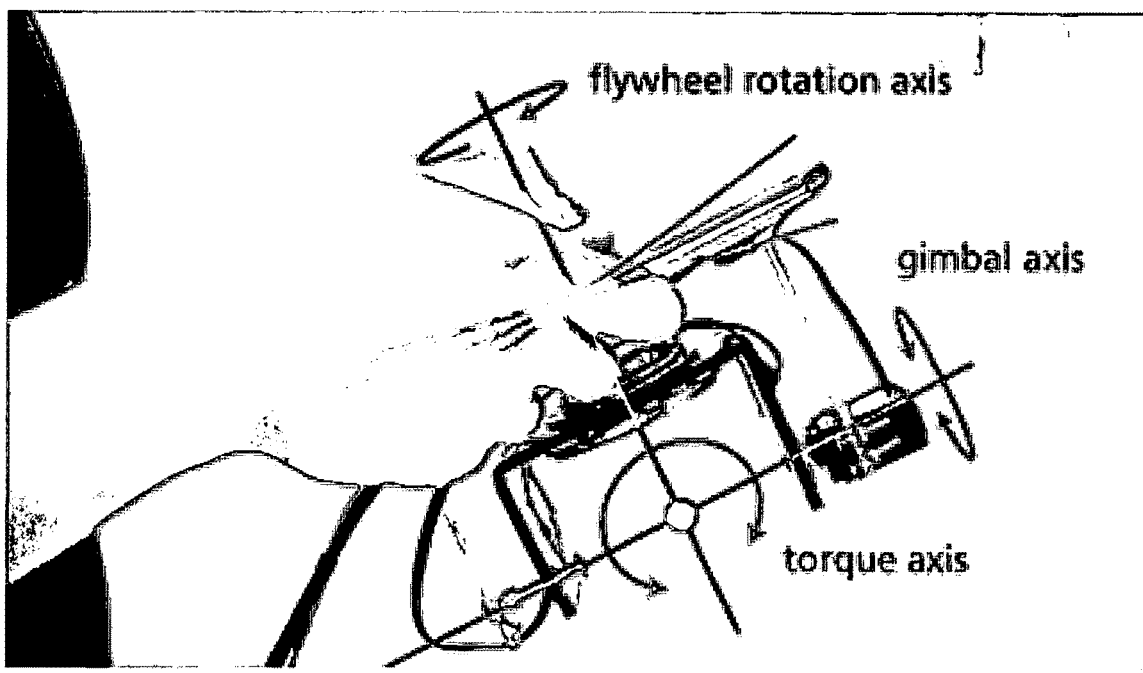

In the context of enhancing this interaction between humans and robots, according to one aspect of the present invention, a new bidirectional jacket is presented that can control a drone 10 or other remote-controllable device with natural and intuitive gesture and give haptic feedback on the body of the user of the jacket, to give humans the embodiment of drone 10 and consequently the sensation of flight. Drones provide for an interesting application as they can go where the human cannot go, which can give new sensations of freedom. In addition, flying has always been a great interest for humans. This device would allow to fly without learning how to use remote controls and thanks to advanced feedback, to have a total immersion as if the user was actually flying. Haptic feedback is a very important feature for situational awareness and immersion. Currently, most robot control relies only on visual feedback which can cause delays in the reaction time and safety issues, as shown in reference [3]. For examples, if an obstacle is out of the field of view, as in the case of a step for walking robot, the pilot would ignore why the robot is stopped. For a robot performing manipulations, the force applies to the object needs to be known to insure the grip. In the case of a drone 10 that is flying, it takes more time to react to perturbations such as wind gusts or turbulence when relying only on vision than if the pilot could feel them haptically.

Indeed, as the reaction is driven by reflexes, the information doesn't have to be treated by the brain and the reaction is up to three (3) times faster, as discussed in references [4], [5]. Haptic feedback consists of two different kinds of feedback: kinetic, which acts on the proprioception of body parts and tactile, which refers to sensations at skin level. Both are important to enhance the symbiosis, and it has been shown that haptic feedback improves the operator's task execution performance. In addition, it is very tiring to treat all information within only one sensory channel, as for example vision, and can cause the pilot to make mistakes. Furthermore, in addition, the jacket can give the users the sensation of flying and the background art solutions are not suited for the consumer market.

According to an aspect of the present invention, a wearable jacket is presented that gives the user the sensation of flying while staying on the ground. Kinetic feedback will render the drone dynamics. While the user assumes a posture that maps the attitude of the drone, no kinetic feedback will be given. But when there is a mismatch, as for example if drone 10 undergoes wind gusts or turbulence, a force will be given to the body of the user via the wearable jacket to bring it to the correct position, which is the one that maps the drone's attitude. Additionally, the kinetic feedback can be used to correct user's movement to improve the performance and/or lower the learning time. With this kinetic feedback device, the user feels a force that pulls their torso in the direction of a predetermined optimal trajectory. The force is relative to the error between the optimal trajectory and the drone. Tactile feedback will recreate air pressure sensation. As an example, in the case of acceleration or during attitude changes, feedback corresponding to the air pressure felt by the drone will be given to the upper body. Also, tactile feedback can be used to give alert to the user such as a low battery or if the robot is in a dangerous position.

Figure 6A:
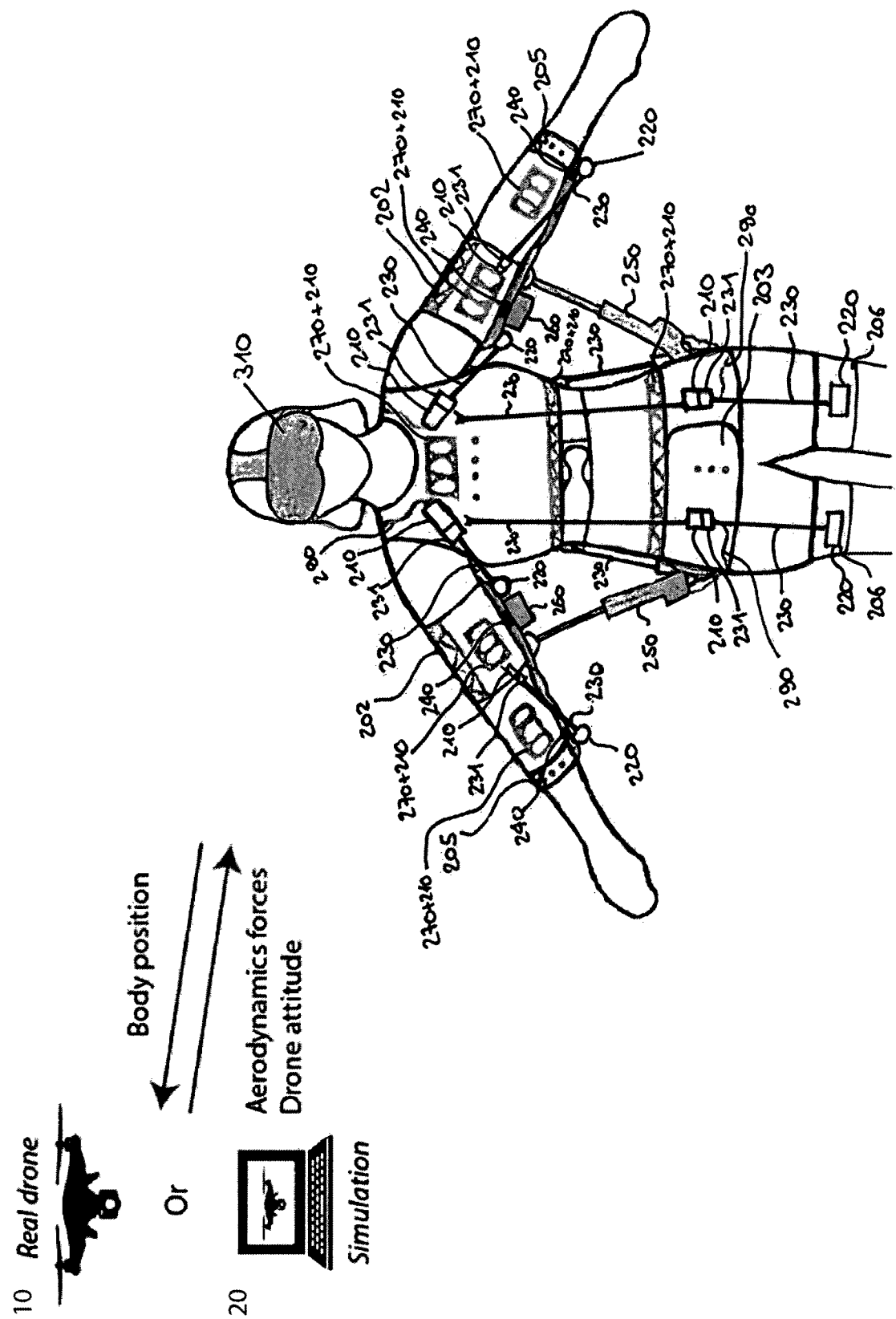
FIGS. 6A and 6B show schematic representations of the jacket with in a front perspective view in communication with a drone 10 or a computer 20 operating or running a simulation software with a virtual drone (FIG. 6A), and a side view showing different elements of the jacket in a non-limiting embodiment.

FIG. 6A shows a system 100 for haptic feedback and control of a flying object, including a drone 10, or by controlling a virtual drone or another type of flying object that is connected via a network to a computer 20 executing a simulation software, and wearable jacket 200 as a soft exoskeleton for the user 300. Either the wearable jacket 200 is used to control and feel the drone 10, or a virtual drone is controlled and felt via wearable jacket 200 in a simulation environment performed on computer 20. If a real drone 10 is controlled, computer 20 is not needed or operated, as communication interface 294 and controller 292 are embedded into the jacket. Analogously, if the user of wearable jacket 200 pilots and controls a simulated drone or UAV in the simulation environment, no drone 10 is needed. Jacket 200 includes a chest portion 201, upper arm portions 202, belt 203, arm sleeves 204, lower arm portions 205, with force sensors 210. Force sensors 210 are located and connected in series with cables 230 that give haptic feedback, and embedded in devices that give haptic feedback 270, 260 and 250. To measure and transmit the signals to computer 20, force sensors 210 are connected to the controller 292. Motors 220 are placed under the upper arm portions 202 and lower arm portions 204, for example on the arm support, on the harness 206 on the thigh and on the lower back on the belt 203. Cables 230 are forming mechanical connections and are located between motors and body parts. For example, cables 230 are arranged between the lower arm portion motor and the upper arm portion 202, between the upper arm portion motor 220 and the chest portion 201 and the upper back, to form a bidirectional pulley, between the thigh motor 220 and the upper chest, and between the lower back motor and the upper back. Motors 220 include a winch or roller device to wind up and release cables 230. Multi-axis inertial measurement units 240 located on moveable elements, for example on lower arm portions 205 on the arm support, upper arm portions 202 on the arm support, and on the middle of the back, linear motors 250 that connect between the belt 203 and the upper arm portions 202, active gyroscopes 260 attached to the upper arm portions 240 and on the chest portion 201, and tactile devices 270 that are attached to the chest portion 201, the back, around the belt 203, at the upper arm portion 202 and lower arm portion 205, a middle section of chest portion 201.

Figure 6B:
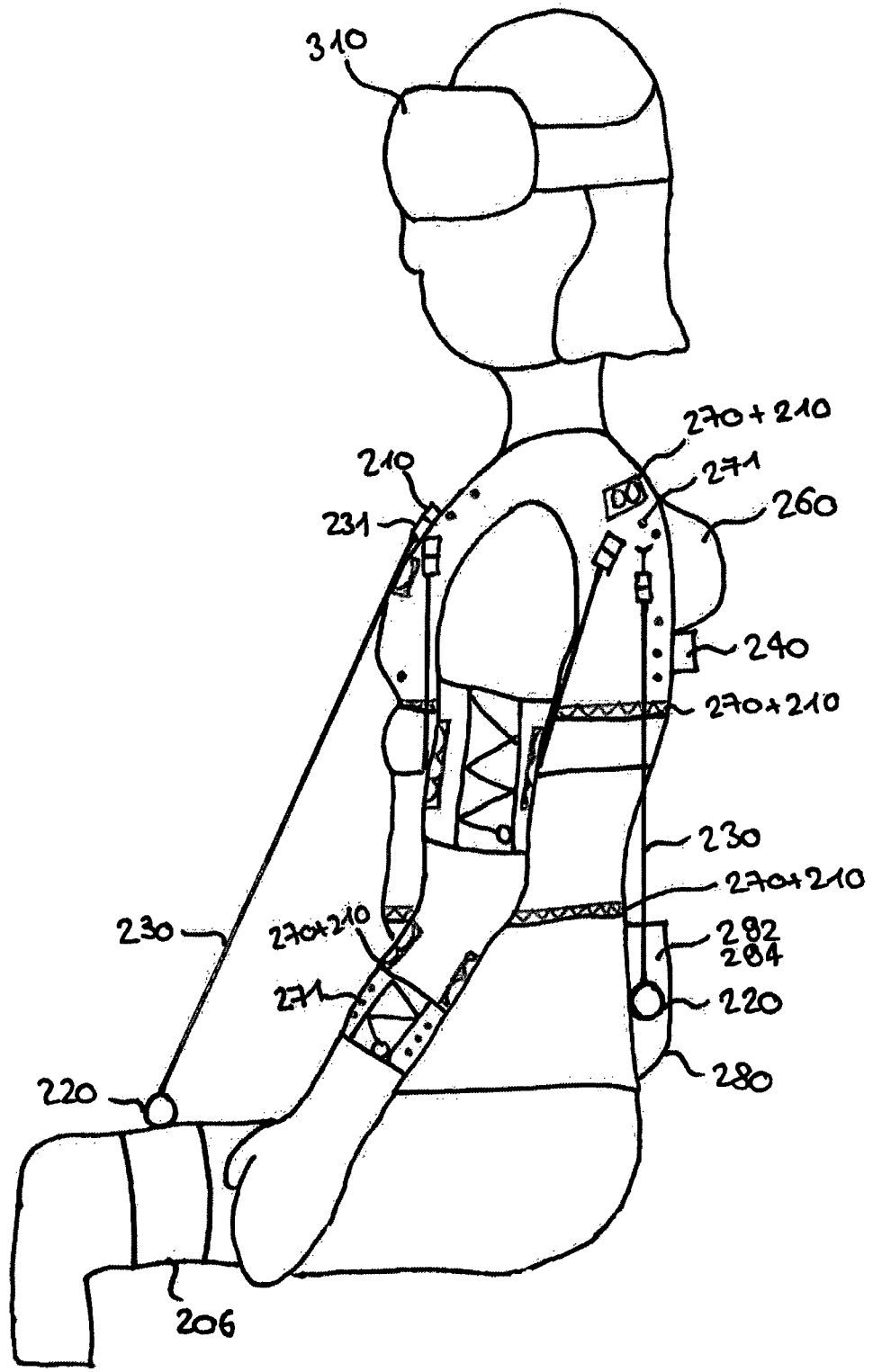

Moreover, FIG. 6B shows a side view of the jacket 200 with active gyroscope 260 arranged between the shoulder blades of user on jacket 200, multi-axis inertial measurement units 240 located in a central area of jacket 200, cables 230 connecting belt 203 with chest portion 201, wires 290 for power transmission, and a container, pocket 280 arranged on the belt 203 for holding control electronics for jacket 200.

Figure 7A:
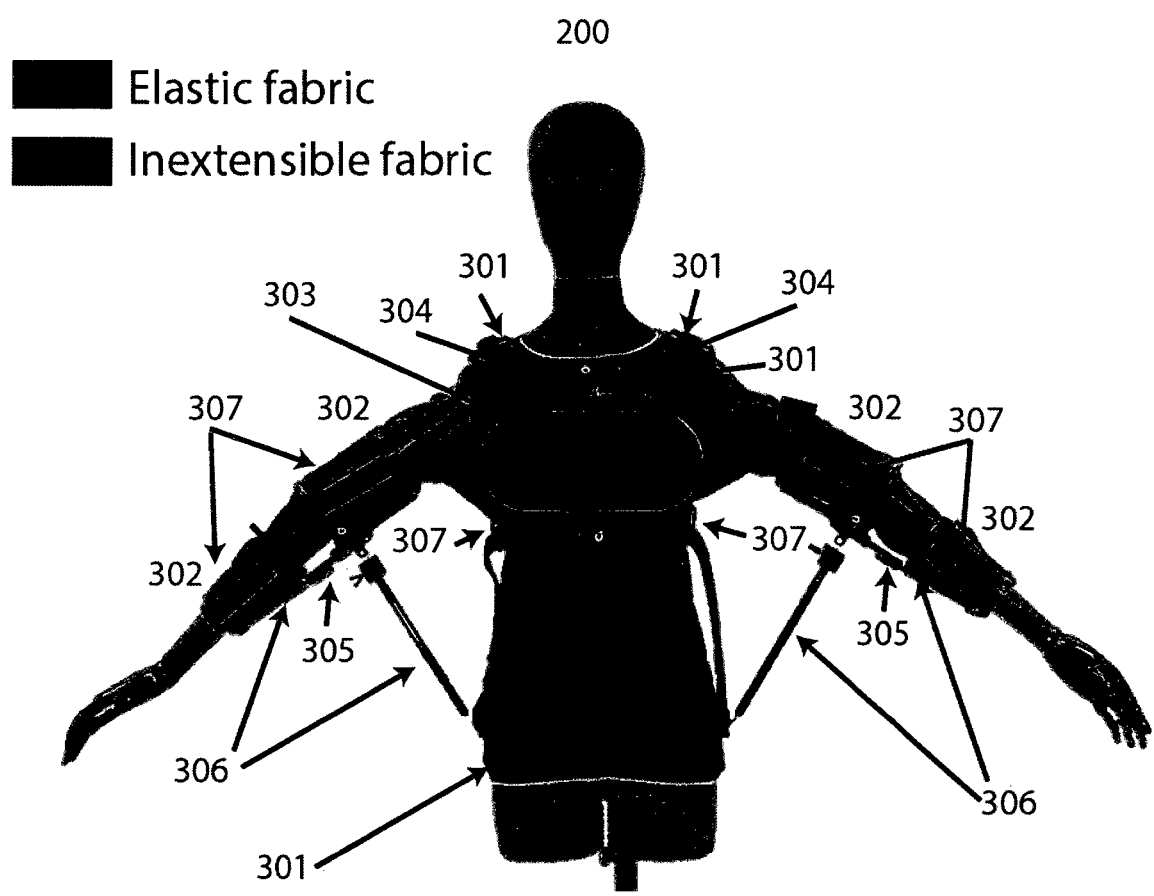
FIGS. 7A to 7C show perspective representations of the jacket 200 from a front perspective view (FIG. 7A), a side perspective view (FIG. 7B), and a rear view (FIG. 7C), without showing the rotative motors and cables, in a non-limiting embodiment.
Figure 7B:
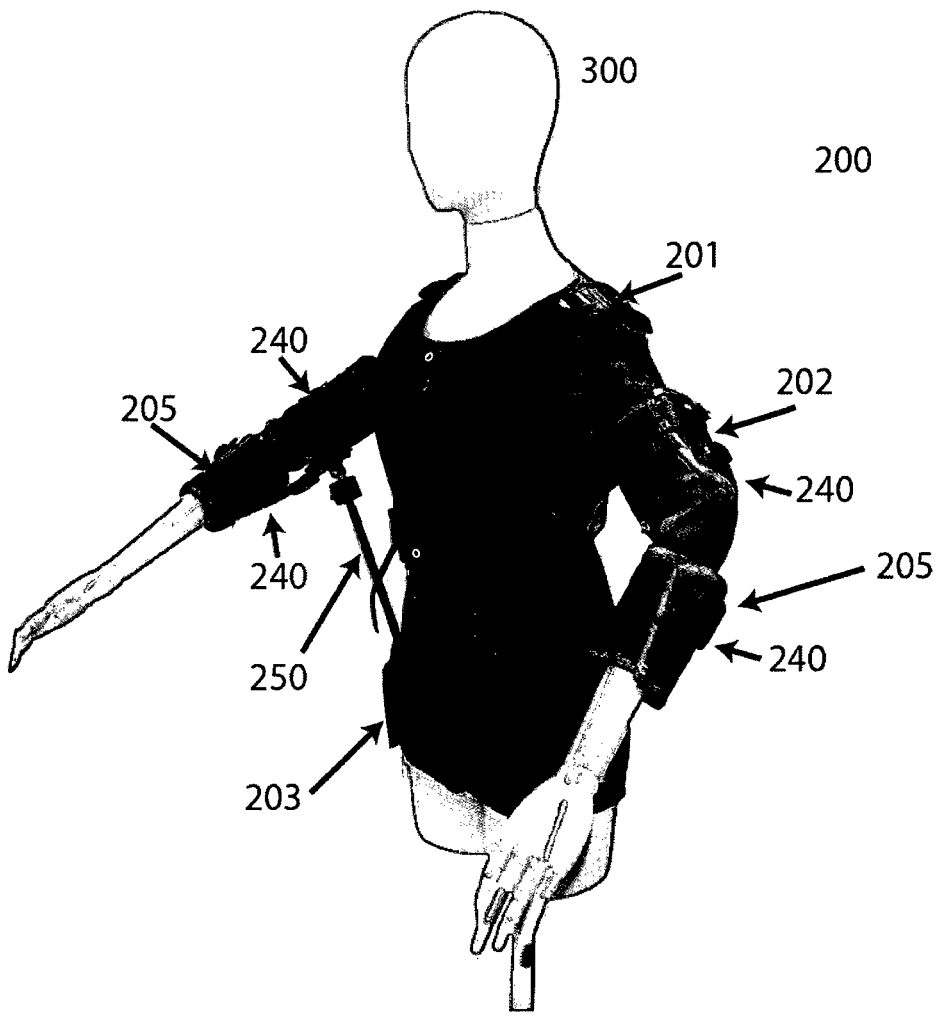
Figure 7C:
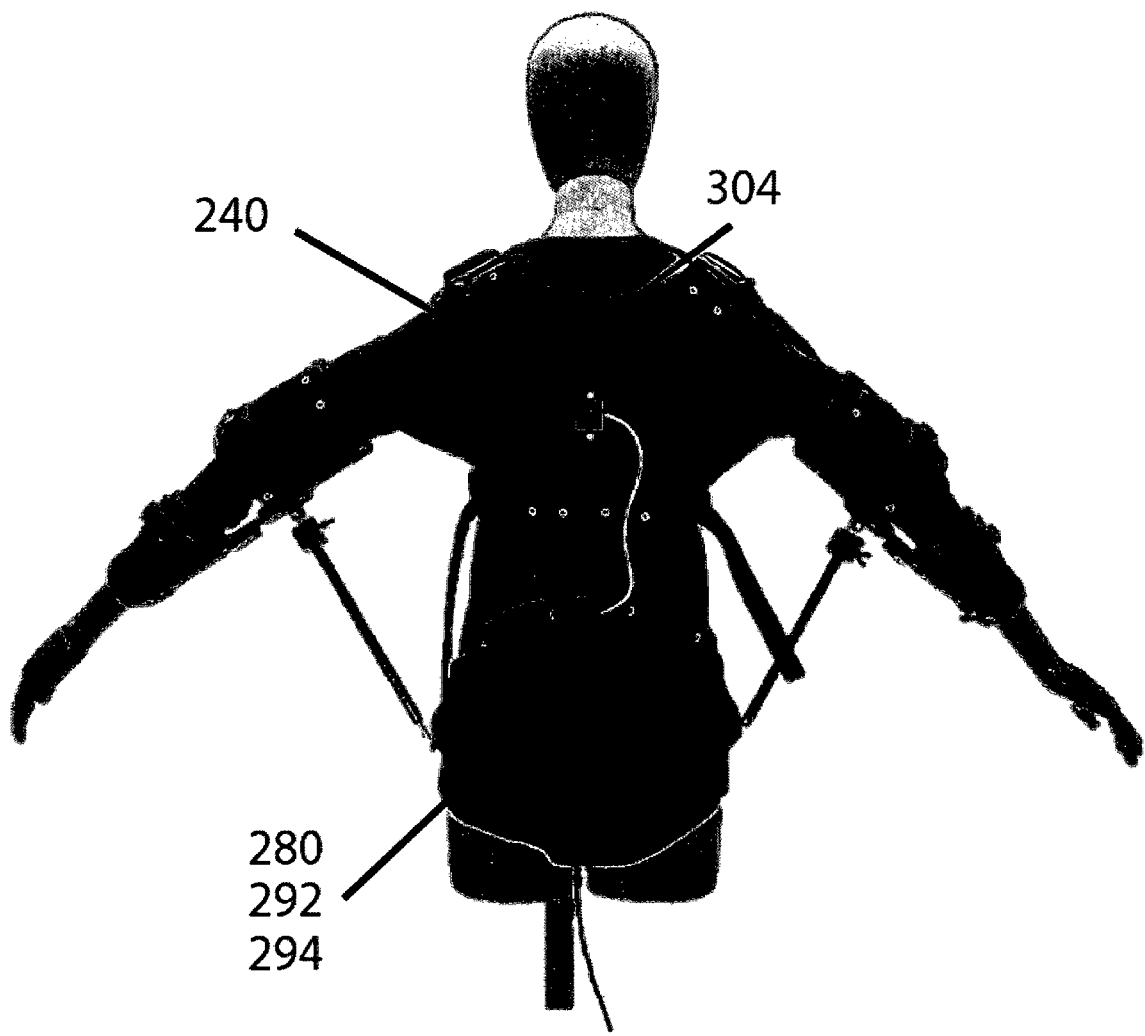
Figure 8:
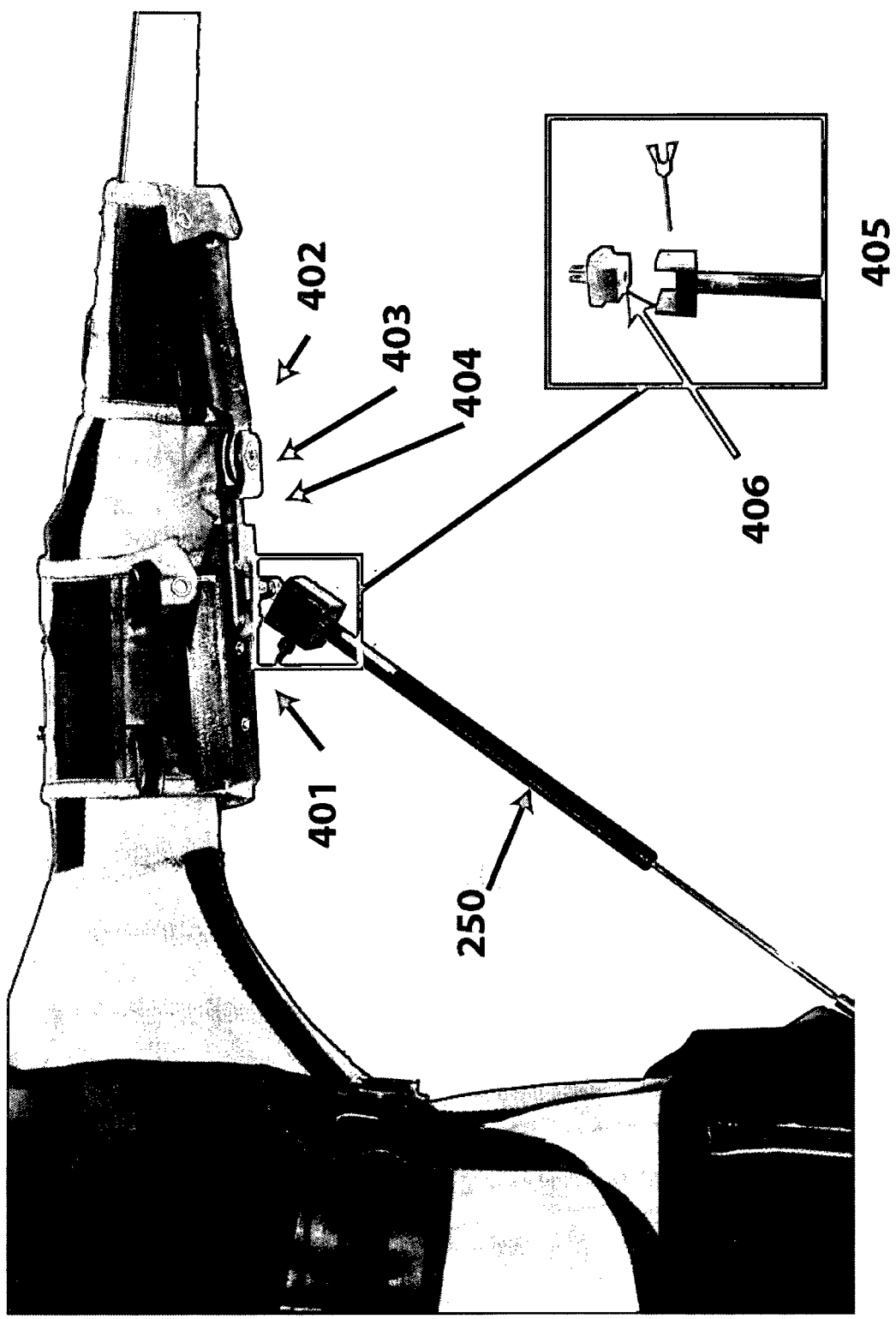
FIG. 8 shows a front partial view of the jacket showing an arm, and the linear motor that connects between belt and the upper arm portion, with a zoom-in section showing the connection, according to an aspect of the present invention.

In FIGS. 7A, 7B, and 7C, wearable jacket 200 is shown with reference numerals for the different passive elements of jacket 200, including Velcro connection elements 301, rotative knob and cable lacing systems 302, also called Boa lacings, extendable room for female users for breasts 303, integral plastic parts 304. Integral plastic parts 304 can be embedded into the textile. Elbow joints 305 are shown in FIG. 7A and 8 that allow to freely bend the elbows of the user. The upper arm portion 202 and lower arm portion 205 can be supported by two plates made of three-dimensionally (3D) printed Acrytonitrite Butadiene Styrene (ABS) with small cushions inside for comfort. These plates are interconnected by the elbow joint 305, which consists of two passive joints, including a rotating joint 403 made of ball bearing to bend the elbow, and a linear joint 404 to absorb misalignments between the center of rotation of the elbow and the rotating joint of the support. The connection between the gas spring and the belt 203 is made of a ball and socket joint and the connection to the arm plates instead consists of a hinge joint to constraint the internal shoulder rotation, linear motors 250 act as arm support actuators or links 306 and the upper arm portions 202 and the lower arms portion 205 made of strong elastic segments 307. Darker shading indicates rigid textile elements, for example made of leather or a synthetic or semi-synthetic material having similar rigid but wearable properties, and lighter shading indicates elastic textile elements. For illustration purposes, some of the elements of FIGS. 6A and 6B are not shown in the representation of FIGS. 7A, 7B, and 7C, for example the motors 220 and cables 230.

The wearable jacket 200 can provide haptic feedback within flight simulators and exoskeletons, using a drone or other flying object 10. To solve the drawback of bulkiness, wearable jacket 200 can be configured as a soft exosuit serving as a man-machine interface. Different technologies are presented that can be used to give kinetic and tactile feedback.

According to another aspect of the present invention, wearable jacket 200 provides bidirectional interaction between a human 300 and a drone 10 is presented. Jacket 200 is equipped with motion tracking capabilities to control a drone 10 or a simulated or virtual drone that is simulated on computer 20 with a simulation environment with body movement of user 300 and with haptic feedback to transmit dynamics and aerodynamic forces of drone to the human body. To prevent fatigue, wearable jacket 200 includes supports for the arms, shown as linear motors 250 as arm support 306 between belt 203 and upper arm portions 202.

Figure 5A:
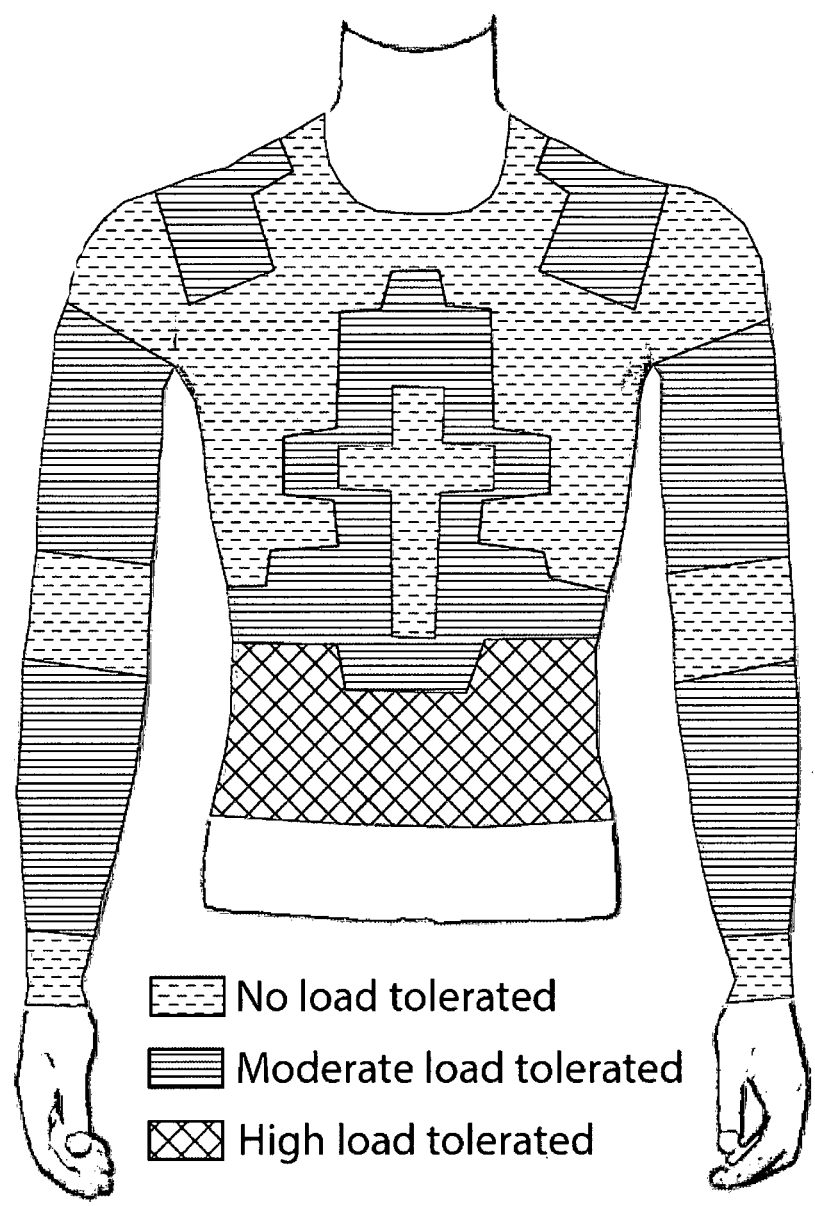
FIG. 5A shows a representation of the pressure sensitivity of a human torso and arms of a user.

With respect to the design of the wearable jacket 200, challenges of the wearable jacket 200 design need to be addressed. At first, the transmission of the jacket load and forces to the human needs to be analyzed. Important factors are the intensity, duration and body area where it is possible to apply load to have an ergonomic and comfortable device. Indeed, inadequate load application can cause problems such as discomfort, fatigue or injuries. The Clothing and Personal Life Support Equipment Laboratory of the American Army studied which torso regions can support the largest pressure to improve the design of their armor, see reference [38]. As presented in FIG. 5A, hips are the least sensitive region and therefore well-suited areas for load bearing. However, one should be careful when using a belt 203 at the waist as it can happen that over an extended period of time the belt 203 slips down. Therefore, preferably a large belt 203 should be used to insure this attachment, in the variant shown an ergonomically-shaped belt having a width of at least 10 cm. Shoulders are the second less sensitive area and the upper back on both sides of the spine is also an excellent bearing area. On the contrary, the spine, flanks at the rib cage level and the middle of the chest are regions most sensitive to pressure and therefore are not suited to bear load. In addition, areas with vessels or nerves such as the axilla or around the neck need to be avoided as they are very sensitive. Concerning the arms, the shoulder, elbow and wrist movement area should be avoided to allow the full range of motion of these joints and no pressure should be applied on bony processes such as the lateral and medial epicondyles for the elbow and radial and ulnar styloid processes for the wrist as it can be painful. These aspects are part of the wearable jacket 200 as shown in FIGS. 6A and 6B and FIGS. 7A, 7B, and 7C.

A second key aspect is the kinematic compatibility between human and robot to avoid any discomfort induced by the robot. By having a structure that matches the human anatomy, the whole kinematics are well controlled. Nevertheless, in case of misalignments, even small, a lever arm is created and a moment is applied on joints or on the skin which can contribute to user discomfort and even lead to injuries. Therefore, as humans have various morphologies, it is crucial to be able to adapt the device size with adjustable parts and to include passive joints to absorb misalignments in the case of rigid structures. The jacket has a passive linear joint 404 at the elbow to adapt the length of the arm support to the arm length of the user, formed with upper arm portion 202. These elements are shown in FIG. 8.

Figure 5B:
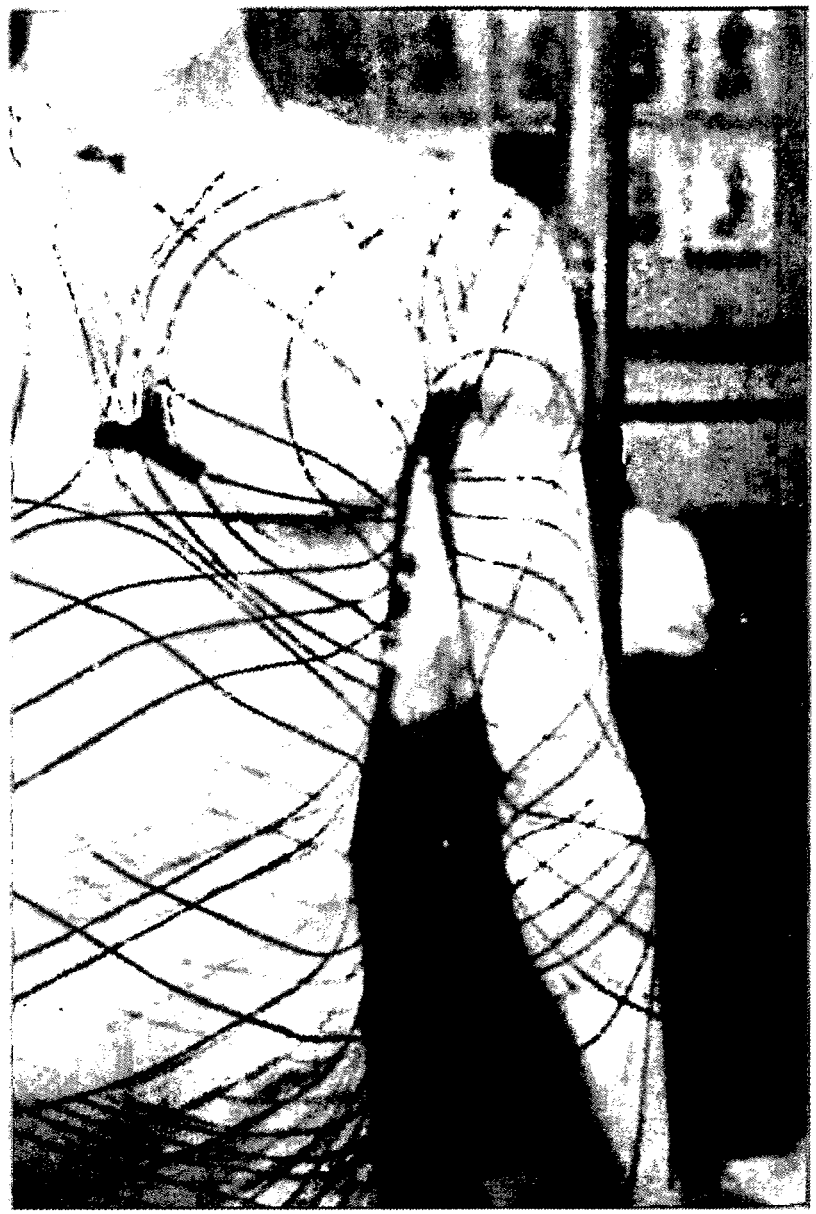
FIG. 5B shows representations of the lines on non-extension of the torso.

Cables 230 are used for force transmission and wires 290 used for electrical signal transmission need to be mechanically stable under stress and reliable for electrical signal connection. To limit the perturbation induced by the mobile deformation of the body on these cables 230 and wires 290, lines of non-extension principle can be applied. This principle describes which regions of the skin that do not move or stretch during motion, as illustrated in FIG. 5B. It was first investigated by the Behavioral Sciences Laboratory of the Aerospace Medical Research Laboratories in the target of designing a spacesuit that fits closely to the body of an astronaut body and is therefore much less cumbersome than current ones, see reference [39]. For example, wires 290 for power supply, and cables 260 for mechanical force transmission can be arranged to be in close proximity and in parallel with the lines of non-extension of a human body.

Additionally, a non-negligible aspect when designing a wearable device is the ease of putting on and taking off wearable jacket 200. Indeed, if removing the device takes a lot of time or an extra person, in addition to being annoying and cumbersome to wear, the user can have the sensation of being trapped inside and can experience stress. Therefore, preferably, jacket 200 needs to be designed intuitively, and should be designed such that it can be put on and removed onto a user by the aid of only one person. All the parts of the jacket are attached together in the most ergonomic way and it was achieved that the jacket can be put on by one person alone and in less than thirty (30) seconds, including the time to adjust the cable lacing.

Also, to allow a large freedom during motion while still having a good connection between wearable jacket 200 and the body of the user 300, the jacket includes two different materials, as shown in FIG. 7. At shoulder joints between chest portion 201 and upper arm portion 202, elbow joints between upper arm portions 202 and lower arm portions 202, and on the lower part of the torso, between chest portion 201 and belt 203, the jacket is made of highly elastic material to remain as unnoticeable as possible and therefore to allow the full body mobility. This textile is made of polyester which is ordinary used for sport clothes. Indeed, as the user may sweat into the jacket while flying, it is important to have a lightweight and breathable material.

At anchoring regions between wearable jacket 200 and user 300 and at supportive location for actuators, the jacket is made of a double layer of leather or equivalent synthetic material to have a rigid support while still remaining compliant and adaptive to the body shape, as illustrated with lighter and darker shadings in FIGS. 7A and 7B. These rigid regions allow a good fixation to the human body and force transmission. Additionally, the frontal region, where cables 230 for actuation are fixed, is reinforced with flexible plastic, having a thickness of about 0.7 mm. These leather rigid regions can adapt to various morphologies thanks to multiple adjustments. Wearable jacket 200 has Velcro strips 301 at the upper shoulder and at the chest front to place correctly the torso support and a non-stretchable textile band with a clip and coils allows to close wearable jacket 200 and adapt the tightening of this piece. This band is in serial with a strong elastic that allows some compliance during change in the torso circumference due to breathing. The middle of the chest is made of elastic textile to allows extra room for breast 303. At the arm and forearm, upper arm portions 202 and lower arm portions 205 size can be adapted to various arm diameters thanks to a cable lacing system 302, for example a rotary knob based thin metal cable lacing system that can be tightened, for example he Boa technology (Boa Technology Inc., Denver, USA) with only one hand. Upper arm portions 202 and lower arm portions 205 possess also strong elastic segments to allow change in arm volume due to muscles contraction during motion.

As user 300 can be embodied into flying robots or drones 10, or other type of manned or unmanned aerial vehicles (UAV), it is important to support the arms to prevent fatigue. Indeed, when using the arms spread out on both sides of the torso of chest portion 201 for controlling drone 10, the user becomes easily tired and therefore less immersed in the flight. Consequently, it is preferable to support the arms to prevent fatigue. This support should be as transparent as possible in order not to prevent the user's motion. Two plates support the upper arm portion 401 and lower arm portion 402 from below and are connected together with a passive hinge joint 403 constituted of a ball bearing in order to have a non-restricted joint rotation and a passive linear joint 404 to absorb misalignments. It is preferable to support the lower arm portion when being in a posture with the elbow bent in the transverse plane because the lower arm portion exerts an axial torque on the upper arm, and causes the shoulder joint muscles to contract to stabilize the arm in rotation. The linear actuator 250 can be disconnected from the upper arm portion supporting plate 401 thanks to a connector bloc 405. To ease the placement and maintain the two parts together, permanent magnets 406 are used and a screw insure the connection. The load of the arms is supported by linear actuators 250 connected to the waist by using belt 203, for example using a commercially available motorcycle belt. They serve also as actuators for the kinetic feedback in the frontal plane. Linear actuators 250 are electrically or pneumatically driven. They are connected to the arm support plate mounted to upper arm portions 202 with a hinge joint and to belt 203 with a ball and socket joint. These joints allow the full range of motion of the arms except for shoulder rotation and the range of motion of the arm abduction is limited from 40 degree to 120 degrees, 0 degree representing the arm along the body. Shoulder rotation had to be restricted as a compromise to give more stability to the arm support and as this movement is not used when flying. In addition, small cushions are inserted on the arm (upper arm portion 202) and forearm (lower arm portion 205) support plates to increase the comfort of the user or jacket wearer.

Kinematic feedback acts on the human joint proprioception and translates the robot attitude. This feedback is implemented at the elbow joint, shoulder joint and torso and is given in a direct way by using actuators directly coupled with the joints or in an indirect way using active gyroscopes 260. Direct actuation can be achieved using different technical solutions such as with cables 230 pulled by motors 220 with a winding winch, motors directly mounted on the joints or pneumatic actuators. Also, in another embodiment, the motor 220 and corresponding cable 230 can be implemented with a pneumatic actuator, for example McKibben™ actuators. Cable actuation with cables 230 has the advantage to allow to place motors 220 on the torso wearable jacket 201 instead of on joints and consequently reduce the device inertia on the limbs. Furthermore, this actuation can be done without rigid joints so the constraint of aligning the centers of rotation of joints of the exoskeleton of rotation with those of the human body is avoided. This prevents joint misalignment and therefore reduces the risk of injuries. Moreover, this kind of actuation can easily be integrated in wearable jacket 200 which increases the user's acceptance.

For the kinetic feedback at arms level on the transverse plane, first cable 230 is going from the chest portion 201 above the pectoralis major muscle to the motor 220 placed at a lower section of upper arm section 202, for example to a support plate. By pulling on this cable 230, the arm is brought forward. The second cable 230 starts on the upper back above the scapula and goes to the same motor 220, shown in the side view of FIG. 6B. Pulling on this cable will bring the arm backward. To give the feedback at the torso level at chest portion 201, four motors 220 placed in the front thigh (one on each leg) on the harness 206 and on the back and sides of the belt and are pulling on cable attached at their other extremities to the rigid chest part to make the user bend in the direction of the actuated cable. To optimize force transmission and lower body motion influence, cables are mostly aligned along the line of non-extension of the skin. To give some compliance so the user doesn't have the impression to be confined into the jacket, springs 231 are mounted in series with cables 220. They can be made of elastic bands or strips, for example the product Thera-band (The Hygienic Corporation, Ohio, USA) elastic bands. These elastic bands were characterized and a Yeoh model for the strain-stress curve was performed, as shown in reference [41]. As the kinetic feedback is force controlled, each actuator is coupled with a force sensor 210 that allows to precisely control the force perceived by user or wearer 300. In the current implementation, wearable jacket 200 is equipped with force sensors 210 that measure the force on cables 230. To have a safe device, a mechanical shunt is implemented between the force sensor 210 and the elastic band. It is constituted of two parts maintained together by permanent magnets. If a too high force is applied to cable 230 exceeding a predefined force threshold, the device will dissociate to protect the user. As mentioned previously, linear actuators 250 are giving kinetic feedback for the abduction movement.

Furthermore, to give fast and strong impulsions to the user, for example to stimulate strong wind gusts, active gyroscopes 260 with a flywheel are mounted under the arm support plate on upper arm section 202 and on the back of the user on chest portion 201. By changing the wheel orientation, a torque can be given to the user in one plane.

Wearable jacket 200 is also providing tactile feedback to recreate air pressure sensation at the skin level, with tactile devices 270. This is done with inflatable pouches or liquid coupled electroactive polymer distributed along arms and torso or another technology. The firstly cited tactile device 270 can be actuated with small capsule of compressed air similar as the one used to inflate bike tires and the secondly cited tactile device 270 electrically. Moreover, wearable jacket 200 has vibro-tactile devices 271, in addition to kinetic feedback such as the cables 230 driven by electrical motors 220 and the tactile feedback such as pneumatic pouches, to give alert to the user such as when the battery is running low or if the robot is in an unstable or dangerous situation for example if it is too close to obstacles. Stimuli can also be given with the help of electrostimulation to translate a large range of sensations such as temperature changes.

Figure 9:
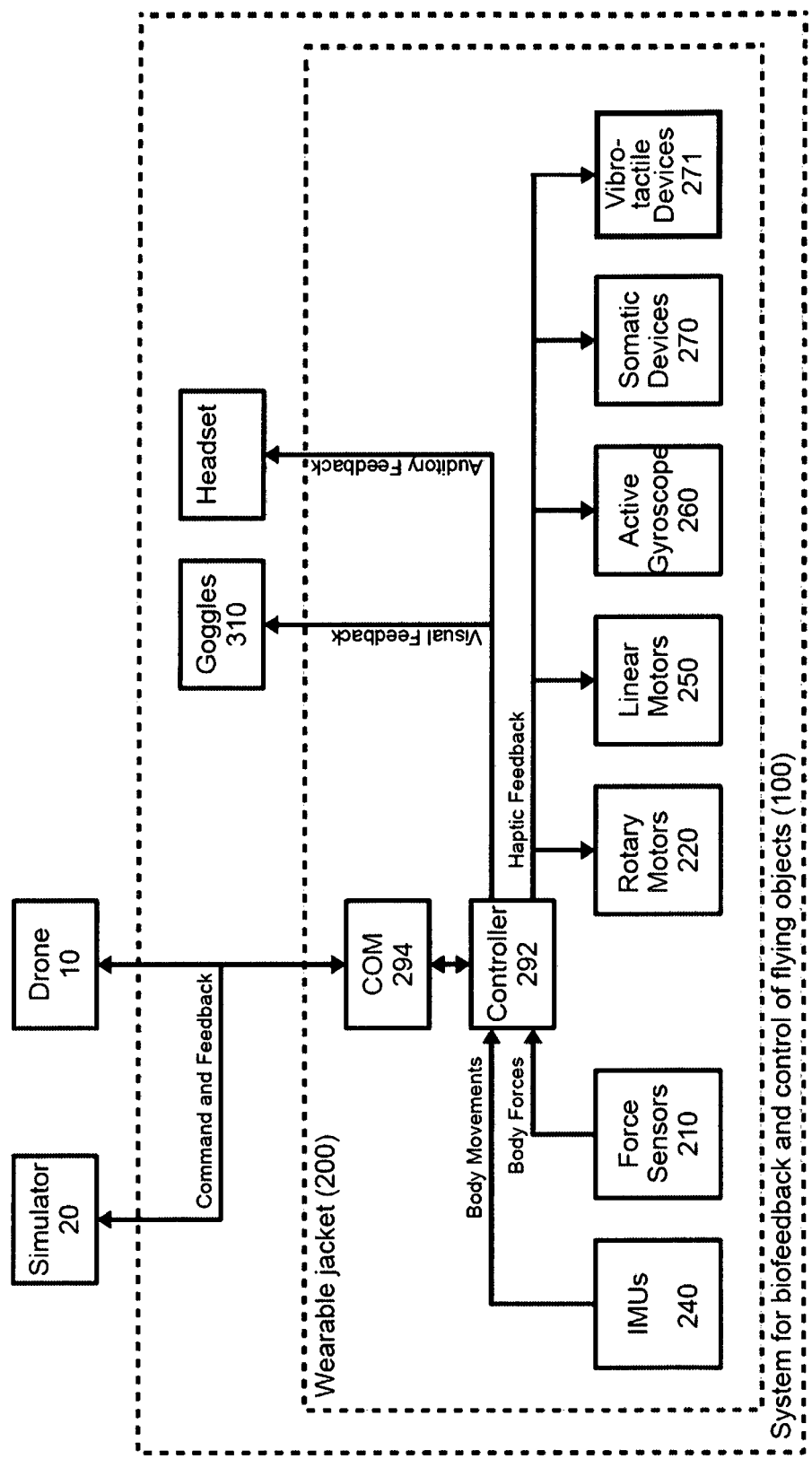
FIG. 9 shows a schematic view of the elements of the jacket 200 that is connected to a drone 10 and a simulator computer 20, according to still another aspect of the invention.

Moreover, as shown in FIG. 7C, wearable jacket 200 also includes a pocket 280, preferably arranged on the lower back torso of chest portion 201, for holding different electronic devices, for example a controller 292 that allows to control the different IMU 240, tactile devices 270, rotary motors 220 for pulling cables 230, linear motors 250, active gyroscopes 260, and for receiving signals from sensors, including force sensors 210, IMU 240, etc. In addition, a telecommunication interface 294, having a data transmission and receiving unit that can be arranged in pocket 280, for communicating with drone 10 or with the simulation environment of computer 10, preferably wirelessly. Also, telecommunication interface 294 is operatively connected to controller 292 for data communication. FIG. 9 shows a schematic view of the interconnections between the elements of the wearable jacket 200, the drone 10, the simulator 20, and the googles 310 and headset, showing controller 292 that is interfaces with all the sensors and actuators of jacket 200.

The body motion is recorded and transmitted to drone 10 or a virtual drone in the simulation environment of computer 10 either by means of an external camera monitoring reflective spots or tracking spots, or by means of embedded Inertial Measurement Units (IMUs) 240 via the telecommunications interface 294 monitoring angles and accelerations of body parts. Both the reflective spots or the IMUs can be integrated directly on wearable jacket 200.

In sum, background art drone remote controllers require a cognitive effort to map the joystick movements into drone movements, this effort is harder when the drone flies towards the user. Although this skill mastered by most people, it requires training and does not produce an immersive flight experience. According to some aspects of the present invention, a haptic feedback and control interface is provided in the form of a wearable jacket 200 that translates human body movements of user 300 into drone control and drone movements for a drone or UAV 10 or a virtual drone of simulation environment into haptic feedback on the human body. When combined with First Person View goggles connected to the drone camera, wearable jacket 200 provides not only intuitive control, but also immersive flight experience. Wearable jacket 200 could be equally combined with Virtual Reality goggles 310 and a simulated virtual drone flying in simulated environment, provided by a computer 20 and simulation software operatively connected to jacket 200. The body motion is recorded and transmitted to the robotic or simulated drone either by means of an external camera monitoring reflective spots or by means of embedded Inertial Measurement Units (IMUs) 240 monitoring angles and accelerations of body parts. Kinetic feedback from the drone movements is provided to the human body by means of electrically actuated cables 230 generating forces on the joints or by means of active gyroscopic flywheels 260 causing momentum joints on the torso and arms.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

REFERENCES

[1] International Federation of Robotics. (May 31, 2016). Services robots statistics, [Online]. Available: http://www.i-fr.org/service-robots/statistics/.

[2] S. Tachi, Telexistence. Springer, 2015.

[3] A. Wang, S. K. A. Balance, J. Ramos, A. Wang, and S. Kim, "A balance feedback human machine interface for humanoid teleoperation in dynamic tasks", Institute of Electrical and Electronics Engineers (IEEE), 2015.

[4] E. Burdet, D. W. Franklin, and T. E. Milner, Human robotics: Neuromechanics and motor control. MIT Press, 2013.

[5] R. Riener, "Rehabilitation engineering 1—motor functions", Lecture notes, 2014, ETH Zurich.

[6] W. Karlen, S. Cardin, D. Thalmann, and D. Floreano, "Enhancing pilot performance with a symbodic system", 2010 Annual International Conference of the IEEE Engineering in Medicine and Biology Society, EMBC'10, pp. 6599-6602, 2010.

[7] P. Robuffo Giordano, H. Deusch, J. Lächele, and H. H. Bülthoff, "Visual-vestibular feedback for enhanced situational awareness in teleoperation of uavs", Proceedings of the American Helicopter Society 66th Annual Forum and Technology Display, pp. 2809-2818, 2010.

[8] M. Rheiner. (May 24, 2016). Birdly, [Online]. Available: http://somniacs.co/birdly/.

[9] Formquadrat. (May 24, 2016). Immersive flight, [Online]. Available: http://www.formquadrat.com/en/concept-design/aec-humphreyii.html.

[10] H. Bülthoff. (May 24, 2016). Cablerobot-simulator, [Online]. Available: https://www.mpg.de/9395107/seilroboter.

[11] Rebelo, Joao, et al. "Bilateral robot teleoperation: A wearable arm exoskeleton featuring an intuitive user interface." IEEE Robotics & Automation Magazine, Vol. 21.4, 2014, pp 62-69.

[12] M. Kim, S. Kang, S. Lee, W. Chung, K. Cho, and C.-w. Lee, "Development of a humanoid robot centaur—design, human interface, planning and control of its upper-body", IEEE International Conference on Systems, Man, and Cybernetics, vol. 4, pp. 948-953, 1999.

[13] Y. S. Kim, J. Lee, S. Lee, and M. Kim, "A force reflected exoskeleton-type masterarm for human-robot interaction", IEEE Transactions on Systems, Man, and Cybernetics Part A: Systems and Humans., vol. 35, no. 2, pp. 198-212, 2005.

[41] A. Schiele and G. Hirzinger, "A new generation of ergonomic exoskeletons—the high-performance x-arm-2 for space robotics telepresence", IEEE International Conference on Intelligent Robots and Systems, pp. 2158-2165, 2011.

[15] Y. Ding, I. Galiana, A. Asbeck, S. De Rossi, J. Bae, T. Santos, V. Araujo, S. Lee, K. Holt, and C. Walsh, "Biomechanical and physiological evaluation of multi-joint assistance with soft exosuits", IEEE Transactions on Neural Systems and Rehabilitation Engineering, vol. 4320, no. c, pp. 1-1, 2016.

[16] Y. Ding, I. Galiana, A. Asbeck, B. Quinlivan, S. Marco, and M. D. Rossi, "Multi joint actuation platform for lower extremity soft exosuits", in IEEE International Conference on Robotics and Automation (ICRA), 2014, pp. 1327-1334.

[17] W. Conor. (Jun. 7, 2016). Exosuit, [Online]. Available: http://people.seas.harvard.edu/_aasbeck/research exosuits.html.

[18] I. Koo, C. Yun, M. V. O. Costa, J. V. F. Scognamiglio, T. A. Yangali, D. Park, and K.-j. C. Member, "Development of a meal assistive exoskeleton made of soft materials for polymyositis patients", International Conference on Intelligent Robots and Systems (IROS), pp. 542-547, 2014.

[19] H. In and K.-j. Cho, "Exo-glove: soft wearable robot for the hand using soft tendon routing system", IEEE Robotics & Automation Magazine, vol. 22, no. 1, pp. 97-105.

[20] Superflex. (May 24, 2016). Biofidelic actuated exosuit, [Online]. Available: https://www.sri.com/sites/default/files/brochures/superflex.pdf.

[21] H. Ando, K. Obana, M. Sugimoto, and T. Maeda, "A wearable force display based on brake change in angular momentum", Proc. ICAT, pp. 4-9, 2002.

[22] D. Lemus and H. Vallery, "Towards gyroscopic balance assistance: proof of concept", in Proceedings of the 36th Annual International Conference of the IEEE Engineering in Medicine and Biology Society (EMBC14), 2014.

[23] D. Li and H. Vallery, "Gyroscopic assistance for human balance", 12th IEEE International Workshop on Advanced Motion Control (AMC), pp. 1-6, 2012.

[24] M. Murer, B. Maurer, H. Huber, I. Aslan, and M. Tscheligi, "Torquescreen: actuated flywheels for ungrounded kinesthetic feedback in handheld devices", Proceedings of the 9th International Conference on Tangible, Embedded, and Embodied Interaction—TEI '15, pp. 161-164, 2015.

[25] Carpenter, Michele, and Kevin Duda. "A new spin on space suits," IEEE Spectrum, Vol. 52.10, 2015, pp. 30-35.

[26] C. Cipriani, M. Dalonzo, and M. C. Carrozza, "A miniature vibrotactile sensory substitution device for multifingered hand prosthetics", IEEE Transactions on Biomedical Engineering, vol. 59, no. 2, pp. 400-408, 2012.

[27] M. K. Dobrzynski, S. Mejri, S. Wischmann, and D. Floreano, "A head-attached vibrotactile display: principles for design and control", IEEE Transaction on Biomedical Engineering, vol. 59, no. 7, pp. 2011-2018, 2012.

[28] U. Yang, Y. Jang, and G. J. Kim, "Designing a vibrotactile wear for close range interaction for yr-based motion training", in International Conference on Advance Technologies and Sciences, 2002.

[29] R. W. Lindeman, R. Page, Y. Yanagida, and J. L. Sibert, "Towards full-body haptic feedback: the design and deployment of a spatialized vibrotactile feedback system," Proceedings of the ACM symposium on Virtual reality software and technology—VRST '04, no. October 2015, p. 146, 2004.

[30] K. A. Kaczmarek, J. G. Webster, P. Bach-y-Rita, and W. J. Tompkins, "Electrotactile and vibrotactile display for sensory substitution systems kaczmarek", IEEE Transactions on Biomedical Engineering, vol. 38, no. 1,

[31] Tesla Studios. (Jun. 1, 2016). Teslasuit, [Online]. Available: http://www.teslastudios.co.uk/.

[32] C. Suh, J. C. Margarit, Y. S. Song, and J. Paik, "Soft pneumatic actuator skin with embedded sensors", in IEEE/RSJ International Conference on Intelligent Robots and Systems (IROS), 2014, pp. 2783-2788.

[33] H. S. Lee, H. Phung, D. H. Lee, U. K. Kim, C. T. Nguyen, H. Moon, J. C. Koo, J. D. Nam, and H. R. Choi, "Design analysis and fabrication of arrayed tactile display based on dielectric elastomer actuator", Sensors and Actuators, A: Physical, vol. 205, pp. 191-198, 2014.

[34] D. De Rossi, F. Carpi, N. Carbonaro, A. Tognetti, and E. P. Scilingo, "Electroactive polymer patches for wearable haptic interfaces", Proceedings of the Annual International Conference of the IEEE Engineering in Medicine and Biology Society, EMBS, no. Section III, pp. 8369-8372, 2011.

[35] D. Dalecki, S. Z. Child, C. H. Raeman, and E. L. Carstensen, "Tactile perception of ultrasound", The Journal of Acoustical Society of America, vol. 97, no. 5, pp. 3165-3170, 1995.

[36] L. R. Gavrilov, E. M. Tsirulnikov, and I. A. I. Davies, "Application of focused ultrasound for the stimulation of neural structures", Ultrasound in Medicine and Biology, vol. 22, no. 2, pp. 179-192, 1996.

[37] J. L. Pons, Wearable Robots—Biomechatronic Exoskeletons. West Sussex, England: John Wiley and Sons, Ltd, 2008.

[38] F. Scribano, M. Burns, and E. R. Barron, "Design, development and fabrication of a personnel armor load profile analyser", Tech. Rep. April, 1970.

[39] A. S. Iberall, "The use of lines of nonextension to improve mobility in full-pressure suits", Tech. Rep., 1964, pp. 1-35.

[41] O. Yeoh, "Some forms of the strain energy function for rubber", Rubber Chemistry and technology, vol. 66, no. 5, pp. 754-771, 1993.

[42] J. Ramos, A. Wang, and S. Kim, "A Balance Feedback Human Machine Interface for Humanoid Teleoperation in Dynamic Tasks", Institute of Electrical and Electronics Engineers (IEEE), 2015.

[43] A. Wang, J. Ramos, J. Mayo, W. Ubellacker, J. Cheung and S. Kim, "The HERMES Humanoid System: A Platform for Full-body Teleoperation with Balance Feedback", IEEE-RAS 15th International Conference on Humanoid Robots (Humanoids), 2015

The invention claimed is:

1. A wearable system for interacting with a remote object comprising:
   a wearable jacket for a user, the wearable jacket including two arm portions and a belt;
   two links for supporting arms of the user, which are physical support links and are not data communication links, one end of each link attached to a respective one of the two arm portions, the other end of each link attached to the belt;
   at least one sensor for measuring at least one of a force applied to the user and a position of the user; and
   a controller and data transmission device for communicating with the remote object.

2. The system according to claim 1, wherein the remote object is a living being.

3. The system according to claim 1, wherein the remote object is an unmanned vehicle.

4. The system according to claim 3, wherein the unmanned vehicle is an UAV.

5. The system according to claim 1, wherein the wearable jacket further includes a chest portion, and the two arm portions include two upper arm portions, and two lower arm portions.

6. The system according to claim 1, further comprising:
   motors for causing movements to at least one of a torso and the arms of the user,
   wherein the motors include a motor attached to the belt and connected to the chest portion via a cable.

7. The system according to claim 5, wherein each one of the two links include an actuator connected between a side of the belt and the upper arm portion of the wearable jacket.

8. The system according to claim 5, further comprising:
   gyroscopic devices arranged on a back of the chest portion and arranged on each upper arm portion.

9. The system according to claim 5, further comprising:
   tactile devices arranged on a front part of the chest portion, on the upper arm portion, and on the lower arm portion, configured to be in contact with a skin of the user.

10. The system according to claim 1, wherein each one of the two arm portions include a cable lacing system for tightening the respective arm portion to a respective arm of the user.

11. The system according to claim 7, wherein the controller is configured to control the two actuators to act as a arm support of the user.

12. The system according to claim 7, wherein the actuator is a linear actuator.

* * * * *